US009370836B2

(12) United States Patent
Asai et al.

(10) Patent No.: US 9,370,836 B2
(45) Date of Patent: Jun. 21, 2016

(54) ELECTRIC DISCHARGE MACHINE AND ELECTRIC DISCHARGE MACHINING METHOD

(75) Inventors: Yoshinori Asai, Chiyoda-ku (JP); Masahiro Okane, Chiyoda-ku (JP); Hidetaka Katougi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 633 days.

(21) Appl. No.: 13/699,340

(22) PCT Filed: Feb. 17, 2012

(86) PCT No.: PCT/JP2012/053863
§ 371 (c)(1),
(2), (4) Date: Nov. 21, 2012

(87) PCT Pub. No.: WO2013/121586
PCT Pub. Date: Aug. 22, 2013

(65) Prior Publication Data
US 2013/0213941 A1    Aug. 22, 2013

(51) Int. Cl.
*B23H 1/02*    (2006.01)
*B23H 9/14*    (2006.01)

(52) U.S. Cl.
CPC ... *B23H 1/02* (2013.01); *B23H 9/14* (2013.01)

(58) Field of Classification Search
CPC ....................................................... B23H 49/14
USPC ...................... 219/69.13, 69.16, 69.17, 69.19
See application file for complete search history.

(56) References Cited

U.S. PATENT DOCUMENTS 3,748,427 A * 7/1973 Baldwin .................... 219/69.19
4,146,770 A * 3/1979 Dinsdale et al. ........... 219/69.17
(Continued)

FOREIGN PATENT DOCUMENTS

JP    57-041135 A    3/1982
JP    61-274813 A    12/1986
(Continued)

OTHER PUBLICATIONS

Japanese Language International Search Report of PCT/JP2012/053863 dated May 22, 2012.

*Primary Examiner* — Thien S Tran
(74) *Attorney, Agent, or Firm* — Sughrue Mion, PLLC; Richard C. Turner

(57) ABSTRACT

An electric discharge machine performs a hole machining on a workpiece by applying a voltage between an electrode and the workpiece to generate an electric discharge therebetween and moving the electrode to a position of a command depth. The electric discharge machine comprises: a storage unit; a current-coordinate detection unit; an electric-discharge-voltage detection unit a penetration detection unit; and a calculation unit. The storage unit stores therein a penetration determination voltage, a penetration determining duration, and a first projecting amount. The current-coordinate detection unit detects a current position of the electrode. The electric-discharge-voltage detection unit detects a minimum voltage of the electric discharge for each predetermined period. The penetration detection unit determines the electrode has penetrated through the workpiece. The calculation unit calculates, a position obtained by adding the first projecting amount to the current position of the electrode detected by the current-coordinate detection unit and updates the command depth.

7 Claims, 10 Drawing Sheets

(56) References Cited

U.S. PATENT DOCUMENTS

| | | | | | |
|---|---|---|---|---|---|
| 4,415,791 | A | * | 11/1983 | Yamada et al. | 219/69.16 |
| 4,484,051 | A | * | 11/1984 | Yamada et al. | 219/69.13 |
| 4,495,394 | A | * | 1/1985 | McGregor et al. | 219/69.13 |
| 4,760,233 | A | * | 7/1988 | Obara | 219/69.16 |
| 4,767,903 | A | * | 8/1988 | Sciaroni | 219/69.17 |
| 5,329,216 | A | * | 7/1994 | Hasegawa et al. | 318/654 |
| 5,847,351 | A | * | 12/1998 | Morita et al. | 219/69.16 |
| 6,723,942 | B1 | * | 4/2004 | Lin et al. | 219/69.17 |

FOREIGN PATENT DOCUMENTS

| | | |
|---|---|---|
| JP | 05-285738 A | 11/1993 |
| JP | 2005-144651 A | 6/2005 |
| JP | 2011-206896 A | 10/2011 |

* cited by examiner

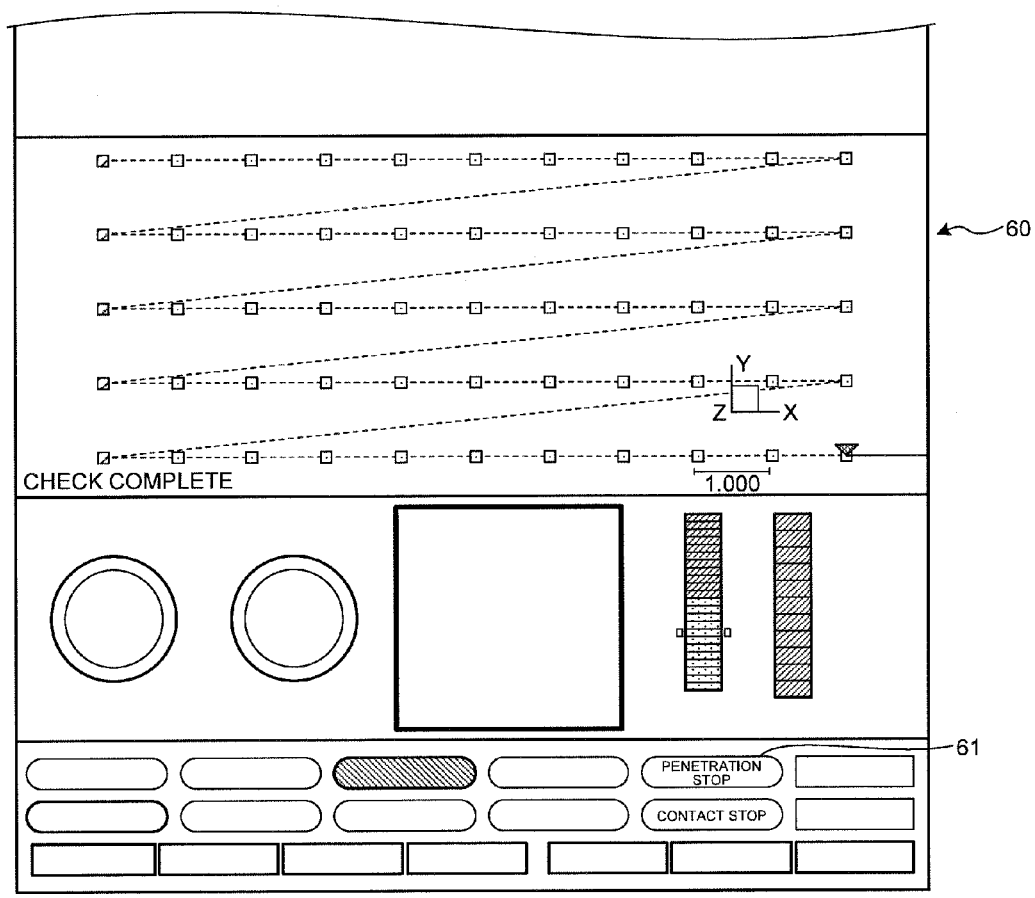

ELECTRIC DISCHARGE MACHINE AND ELECTRIC DISCHARGE MACHINING METHOD

CROSS REFERENCE TO RELATED APPLICATIONS

This application is a National Stage of International Application No. PCT/JP2012/053863 filed Feb. 17, 2012, the contents of all of which are incorporated herein by reference in their entirety.

FIELD

The present invention relates to an electric discharge machine and an electric discharge machining method.

BACKGROUND

When creating a hole through a workpiece by electric discharge machining, a feed amount of an electrode needs to be set in anticipation of a wear amount of the electrode because the electrode is worn away during the machining.

Because the wear of the electrode is not always constant, in order to avoid a situation in which the machining ends before the hole penetrates through the workpiece, the consumption amount of the electrode needs to be estimated larger. However, if an amount of projecting the electrode after penetrating through the workpiece is too large, an edge of the hole becomes sagged, and therefore, it is not desirable to set the projecting amount of the electrode more than necessary.

Furthermore, in the case of machining in which a hole is created on only an upper side plate of two plates arranged in an overlapped manner with a space therebetween, if the electrode after penetrating through the upper side plate is projected more than necessary, the electrode may hit a lower side plate.

In order to prevent such event from occurring, a position at which the electrode has penetrated through the workpiece needs to be accurately detected.

In Patent Literature 1, a technique has been disclosed in which the maximum voltage is compared with a predetermined voltage value in a state where an update of a lowering position of an electrode is detected during machining, and when an event in which the maximum voltage is increased to be equal to or higher than the predetermined voltage value occurs continuously for a predetermined number of times or more, it is determined that a hole created by electric discharge has penetrated through a workpiece.

CITATION LIST

Patent Literature

Patent Literature 1: Japanese Patent Application Laid-open No. 2005-144651

SUMMARY

Technical Problem

The conventional technique mentioned above is achieved on the assumption that the maximum voltage is decreased during the machining; however, if the maximum voltage is not decreased enough during the machining, the maximum voltage does not show an enough difference between before and after the penetration of the electrode, causing a problem that a determination cannot be made.

The present invention has been made in view of the above problems, and an object of the present invention is to provide an electric discharge machine and an electric discharge machining method capable of an accurate detection of a position at which an electrode has penetrated through a workpiece.

Solution to Problem

To solve the above described problems and achieve the object, according to the present invention an electric discharge machine performs a hole machining on a workpiece by applying a voltage between an electrode and the workpiece to generate an electric discharge therebetween and moving the electrode to a position of a command depth. The electric discharge machine comprises: a storage unit that stores in advance therein a penetration determination voltage and a penetration determining duration used for determining whether the electrode has penetrated through the workpiece, a first projecting amount used for deciding a projecting amount of the electrode after penetrating through the workpiece, and the command depth; a current-coordinate detection unit that detects a current position of the electrode; an electric-discharge-voltage detection unit that detects a minimum voltage of the electric discharge for each predetermined period during execution of the hole machining; a penetration detection unit that determines, when a state where the minimum voltage detected by the electric-discharge-voltage detection unit is higher than the penetration determination voltage continues for a time equal to or longer than the penetration determining duration, that the electrode has penetrated through the workpiece; and a calculation unit that calculates, at a time when the penetration detection unit determines that the electrode has penetrated through the workpiece, a position obtained by adding the first projecting amount to the current position of the electrode detected by the current-coordinate detection unit and updates the command depth stored in the storage unit with the calculated position, and when the command depth is updated, the electric discharge machine moves the electrode from the current position to a position of the updated command depth.

Advantageous Effects of Invention

The electric discharge machine and the electric discharge machining method according to the present invention can accurately detect a position at which an electrode has penetrated through a workpiece and suppress a projecting amount of the electrode penetrated through the workpiece to an amount that is necessary and sufficient.

BRIEF DESCRIPTION OF DRAWINGS

FIG. 6A is an example of a monitor screen of an electric discharge machine during machining.

DESCRIPTION OF EMBODIMENTS

Exemplary embodiments of an electric discharge machine and an electric discharge machining method according to the present invention will be explained below in detail with reference to the accompanying drawings. The present invention is not limited to the embodiments.

First Embodiment

Figure 1:
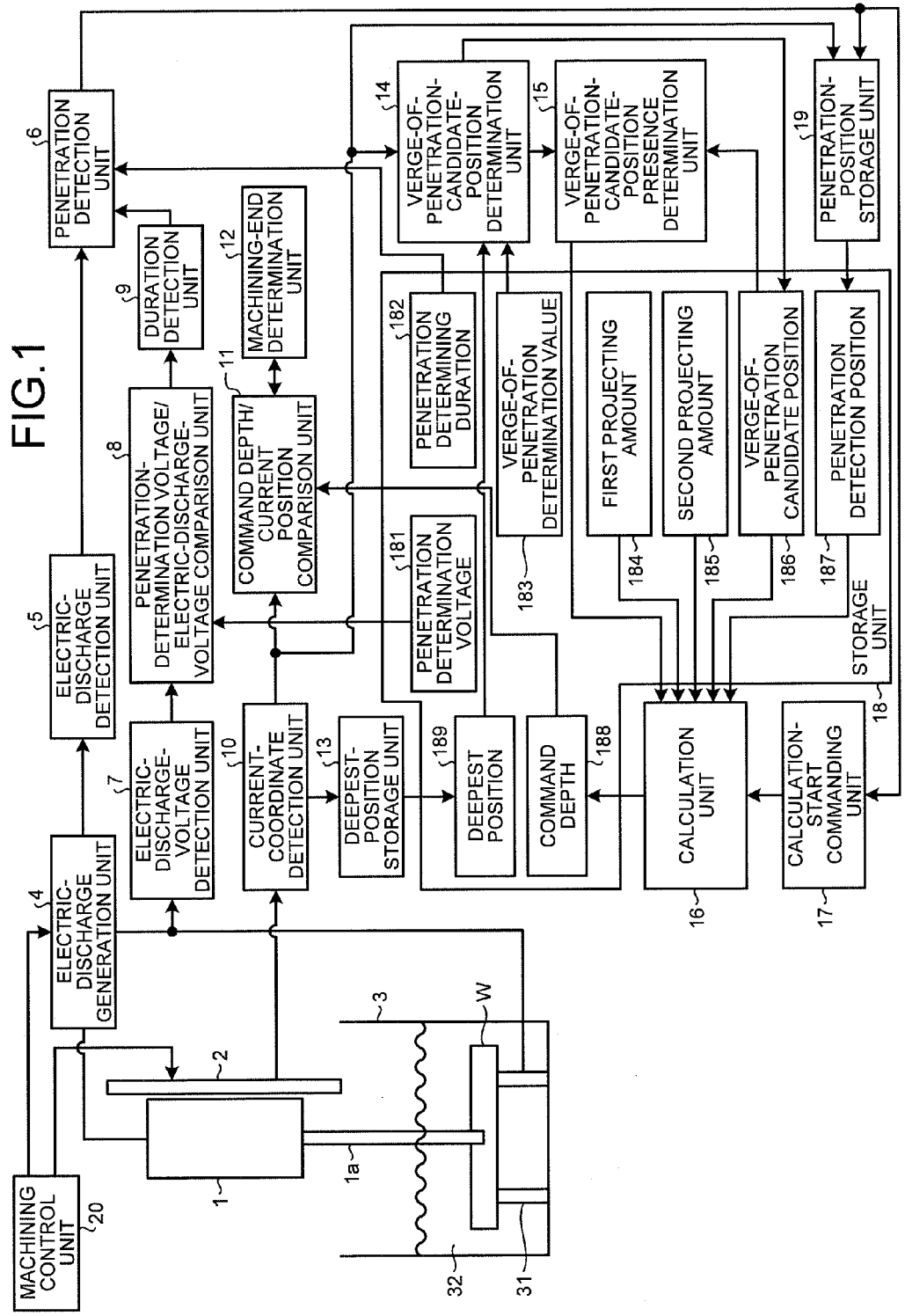
FIG. 1 depicts a configuration of an electric discharge machine according to a first embodiment of the present invention.

FIG. 1 depicts a configuration of an electric discharge machine according to a first embodiment of the present invention. The electric discharge machine according to the first embodiment includes a machining head 1, a feeding mechanism 2, a machining tub 3, an electric-discharge generation unit 4, an electric-discharge detection unit 5, a penetration detection unit 6, an electric-discharge-voltage detection unit 7, a penetration-determination voltage/electric-discharge-voltage comparison unit 8, a duration detection unit 9, a current-coordinate detection unit 10, a command depth/current position comparison unit 11, a machining-end determination unit 12, a deepest-position storage unit 13, a verge-of-penetration-candidate-position determination unit 14, a verge-of-penetration-candidate-position presence determination unit 15, a calculation unit 16, a calculation-start commanding unit 17, a storage unit 18, a penetration-position storage unit 19, and a machining control unit 20.

The storage unit 18 stores therein a penetration determination voltage 181, a penetration determining duration 182, a verge-of-penetration determination value 183, a first projecting amount 184, a second projecting amount 185, a verge-of-penetration candidate position 186, a penetration detection position 187, a command depth 188, and a deepest position 189.

A workpiece supporting mount 31 is arranged in the machining tub 3. A workpiece W is placed on the workpiece supporting mount 31, so that the workpiece W is dipped into a machining fluid 32.

An electrode 1a is installed on the machining head 1. A voltage is applied between the electrode 1a and the workpiece supporting mount 31 by the electric-discharge generation unit 4, by which an electric discharge is generated between the electrode 1a and the workpiece W, and a machining is performed on the workpiece W. A position of the electrode 1a is changed by the feeding mechanism 2 moving the machining head 1. The electric discharge between the electrode 1a and the workpiece W is detected by the electric-discharge detection unit 5, and the generation of the electric discharge is notified to the penetration detection unit 6.

A voltage value (an electric discharge voltage) of the voltage applied between the electrode 1a and the workpiece supporting mount 31 is detected by the electric-discharge-voltage detection unit 7. The penetration-determination voltage/electric-discharge-voltage comparison unit 8 compares the minimum voltage of the electric discharge voltage detected by the electric-discharge-voltage detection unit 7 in a predetermined period (one cycle of a penetration determination) with the penetration determination voltage 181 stored in the storage unit 18, and outputs a result of the comparison to the duration detection unit 9.

When the electric-discharge-voltage detection unit 7 outputs a detection result in every detection of the electric discharge voltage, all the measurement results of the electric discharge voltage for one cycle of the penetration determination may be input to the penetration-determination voltage/electric-discharge-voltage comparison unit 8 so that the penetration-determination voltage/electric-discharge-voltage comparison unit 8 selects the minimum value of the electric discharge voltage in one cycle of the penetration determination to compare the selected minimum value with the penetration determination voltage 181. Alternatively, a minimum electric-discharge-voltage detection unit (not shown) may be provided between the electric-discharge-voltage detection unit 7 and the penetration-determination voltage/electric-discharge-voltage comparison unit 8 so that only the minimum value of the electric discharge voltage in one cycle of the penetration determination is input to the penetration-determination voltage/electric-discharge-voltage comparison unit 8 to compare the minimum value with the penetration determination voltage 181. On the other hand, when the electric-discharge-voltage detection unit 7 outputs the detection results for each predetermined period (for each sampling period), only the minimum value of the electric discharge voltage may be output to the penetration-determination voltage/electric-discharge-voltage comparison unit 8.

The duration detection unit 9 measures a time for which a state where the minimum value of the electric discharge voltage exceeds the penetration determination voltage 181 continues. The penetration detection unit 6 determines that the electrode 1a has penetrated through the workpiece W when the time measured by the duration detection unit 9 exceeds the penetration determining duration 182. That is, when a state where the minimum voltage detected by the electric-discharge-voltage detection unit 7 is higher than the penetration determination voltage 181 that is set in advance continues for a predetermined period (equal to or longer than the penetration determining duration 182), the penetration detection unit 6 determines that the electrode 1a has penetrated through the workpiece W. The penetration detection unit 6 outputs a penetration detection result to the calculation-start commanding unit 17.

The current-coordinate detection unit 10 detects a current coordinate position of the machining head 1 (the electrode 1a). The command depth/current position comparison unit 11 compares the current position of the electrode 1a detected by the current-coordinate detection unit 10 with the command depth 188 stored in the storage unit 18. The machining-end determination unit 12 determines whether the machining is to be ended based on a determination result from the command depth/current position comparison unit 11.

The deepest position storage unit 13 stores a position at which the electrode 1a has approached closest to the command depth 188 in the storage unit 18 as the deepest position 189 based on the current coordinate position detected by the current-coordinate detection unit 10.

The verge-of-penetration-candidate-position determination unit 14 determines whether the deepest position 189 is a verge-of-penetration candidate position based on the deepest position 189 and the verge-of-penetration determination value 183 that are stored in the storage unit 18 and the current coordinate position input from the current-coordinate detection unit 10. When the deepest position 189 is a verge-of-penetration candidate position, the verge-of-penetration-candidate-position determination unit 14 stores the deepest position 189 in the storage unit 18 as the verge-of-penetration candidate position 186. The verge-of-penetration-candidate-position presence determination unit 15 determines whether the verge-of-penetration candidate position 186 is stored in the storage unit 18, and outputs a determination result to the calculation unit 16.

The calculation-start commanding unit 17 outputs a calculation start command to the calculation unit 16 in response to the penetration detection result input from the penetration detection unit 6. The calculation unit 16 calculates the command depth 188 based on the first projecting amount 184, the second projecting amount 185, the verge-of-penetration candidate position 186, the penetration detection position 187, and the determination result input from the verge-of-penetration-candidate-position presence determination unit 15 that are stored in the storage unit 18, and stores the command depth 188 in the storage unit 18.

When the penetration is detected based on the penetration detection result input from the penetration detection unit 6, the penetration-position storage unit 19 stores a position specified by the current coordinate position input from the current-coordinate detection unit 10 in the storage unit 18 as the penetration detection position 187.

The machining control unit 20 sends a command to the feeding mechanism 2 and the electric-discharge generation unit 4 by executing an NC program to move the machining head 1 (the electrode 1a) or switch ON/OFF of the electric discharge between the electrode 1a and the workpiece W. The electric discharge machine performs machining on the workpiece W based on a control by the machining control unit 20.

Figure 2A:
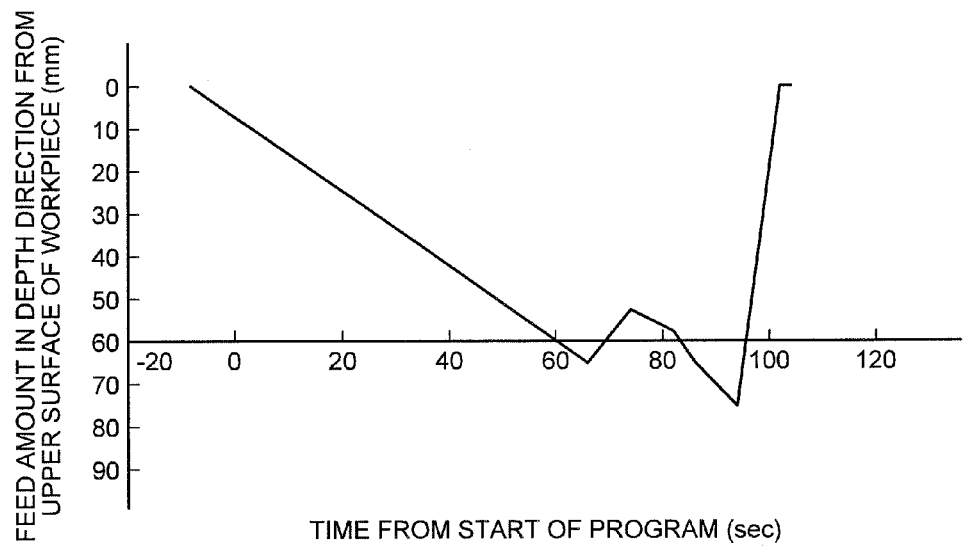
FIG. 2A is an example of a change of a feed amount of an electrode from an electric discharge start position.
Figure 2B:
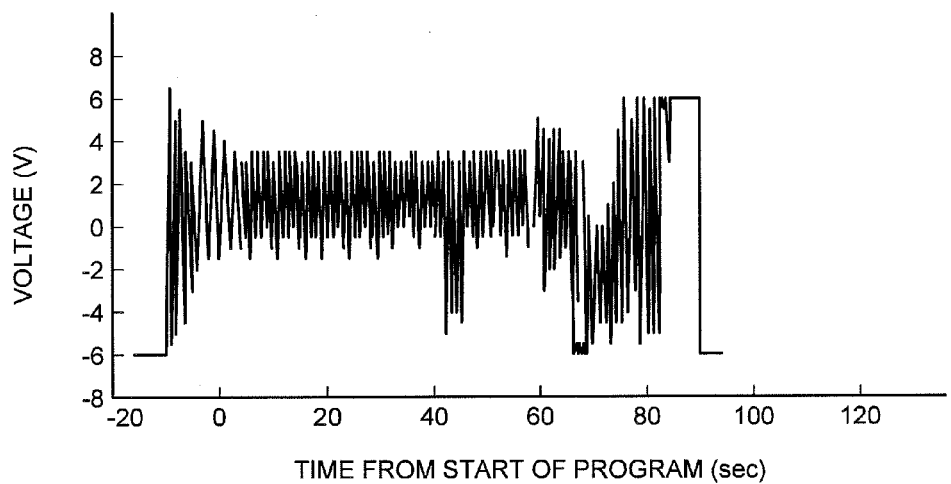
FIG. 2B is an example of a change of an electric discharge voltage.

FIG. 2A is an example of a change of a feed amount of the electrode from an electric discharge start position, where the horizontal axis represents a time (sec) from a start of a program and the vertical axis represents a feed amount (mm) from an upper surface of a workpiece in a depth direction. FIG. 2B is an example of a change of an electric discharge voltage, where the horizontal axis represents a time (sec) from the start of the program and the vertical axis represents a voltage (V). When slightly over 60 seconds has elapsed since the start of the program, the machining control unit 20 detects unstable machining before the electrode 1a penetrates through the workpiece W from a change of an electric discharge pulse or the voltage, and performs a control to lift the electrode 1a once. Thereafter, the machining control unit 20 lowers the electrode 1a again at a time when about 70 seconds has passed since the start of the program, and after a time when the feed amount in the depth direction has reached a certain value (a time when slightly 80 seconds has elapsed since the start of the program), substantially no electric discharge is generated and the electric discharge voltage rises.

At this time, a transition of the minimum value of the electric discharge voltage represents a constant level during the machining. However, when the electrode 1a penetrates through the workpiece W, the minimum value of the electric discharge voltage is maintained at a high value. Therefore, the penetration can be detected at a time when the minimum value of the electric discharge voltage becomes equal to or higher than a certain value.

Furthermore, when the machining control unit 20 performs the operation of lifting the electrode 1a in the above manner, there is a possibility that the electrode 1a has been fed to a position that is deeper than the current position of the electrode at a time in the past. Therefore, the penetration position can be accurately detected by detecting a depth right before the electrode 1a penetrates through the workpiece W. That is, by updating and storing the deepest position 189 of the electrode 1a in real time during the machining, if there is a difference equal to or larger than a predetermined value between the deepest position 189 and the current position, the verge-of-penetration-candidate-position determination unit 14 can determine the deepest position 189 as the verge-of-penetration candidate position 186 at that time.

Figure 3A:
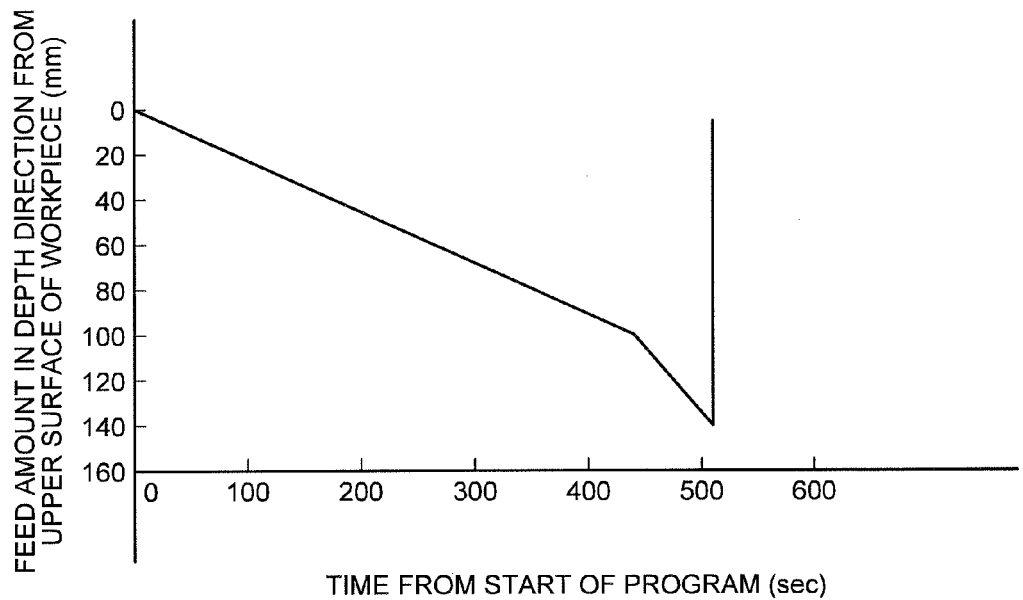
FIG. 3A is another example of a change of a feed amount of an electrode from an electric discharge start position.
Figure 3B:
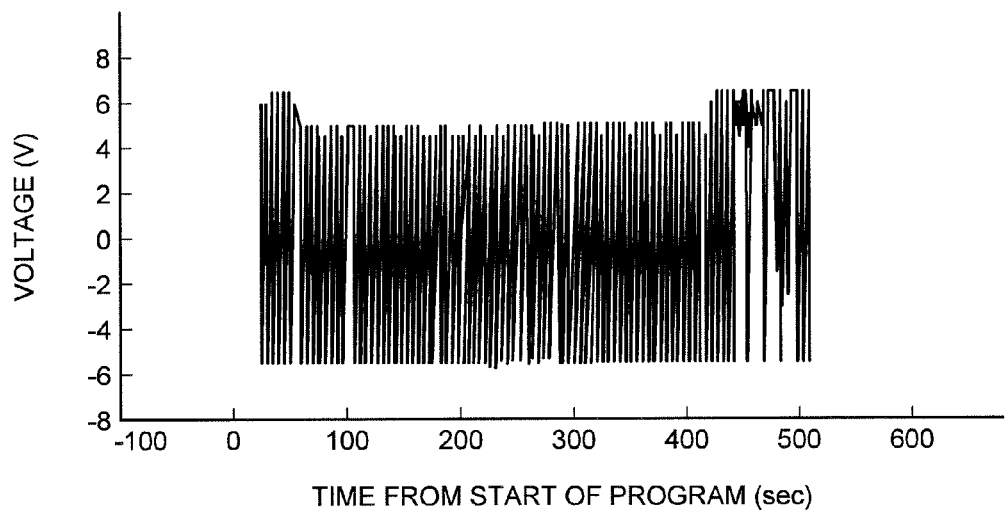
FIG. 3B is another example of a change of an electric discharge voltage.

FIG. 3A is another example of a change of a feed amount of an electrode from an electric discharge start position, where the horizontal axis represents a time (sec) from the start of the program and the vertical axis represents a feed amount (mm) from the upper surface of a workpiece in the depth direction. FIG. 3B is another example of a change of an electric discharge voltage, where the horizontal axis represents a time (sec) from the start of the program and the vertical axis represents a voltage (V). Because the electric discharge voltage is not decreased before the electrode 1a penetrates through a workpiece W, the machining control unit 20 does not perform the operation of lifting the electrode 1a. In this example, a difference between the maximum value of the electric discharge voltage during the machining and the electric discharge voltage after the electrode 1a has penetrated through the workpiece W is small. Therefore, under this type of machining condition, it is not possible to detect the penetration of the electrode through the workpiece with the method of Patent Literature 1, which determines the penetration based on the maximum value of the electric discharge voltage. However, in the first embodiment, because the penetration is determined based on the minimum value of the electric discharge voltage, the penetration of the electrode 1a through the workpiece W can be detected even under this type of machining condition.

Figure 4A:
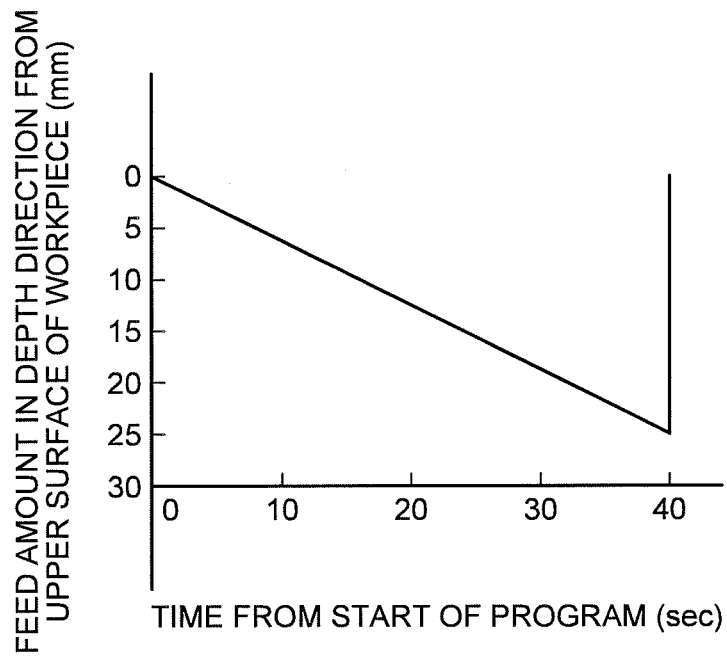
FIG. 4A is still another example of a change of a feed amount of an electrode from an electric discharge start position.
Figure 4B:
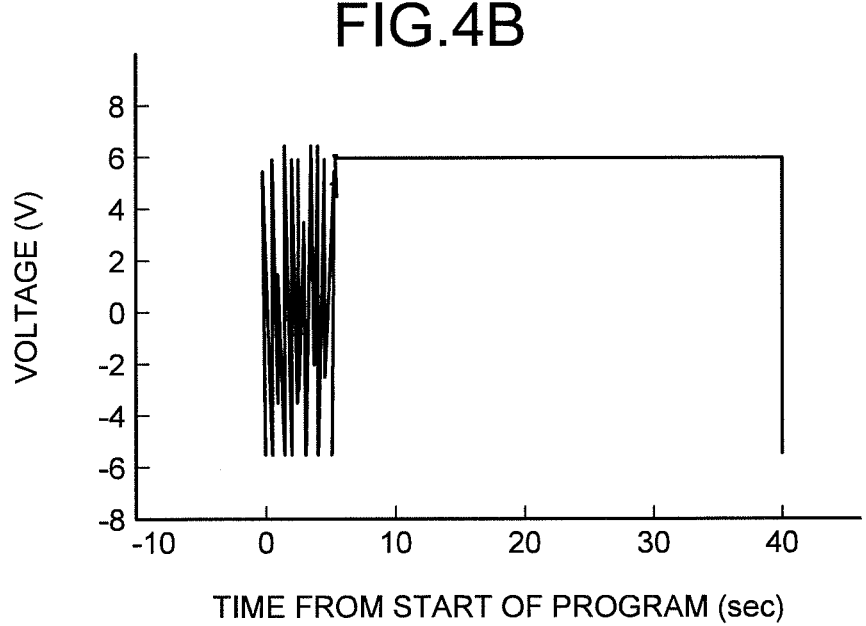
FIG. 4B is still another example of a change of an electric discharge voltage.

FIG. 4A is still another example of a change of a feed amount of an electrode from an electric discharge start position, where the horizontal axis represents a time (sec) from the start of the program and the vertical axis represents a feed amount (mm) from the upper surface of a workpiece in the depth direction. FIG. 4B is still another example of a change of an electric discharge voltage, where the horizontal axis represents a time (sec) from the start of the program and the vertical axis represents a voltage (V). Because the electric discharge voltage is not decreased before the electrode 1a penetrates through a workpiece W, the machining control unit 20 does not perform the operation of lifting the electrode 1a. In this example as well, the difference between the maximum value of the electric discharge voltage during the machining and the electric discharge voltage after the electrode 1a has penetrated through the workpiece W is small. Therefore, under this type of machining condition, it is not possible to detect the penetration of the electrode through the workpiece with the method of Patent Literature 1, which determines the penetration based on the maximum value of the electric discharge voltage. However, in the first embodiment, because the penetration is determined based on the minimum value of the electric discharge voltage, the penetration of the electrode 1a through the workpiece W can be detected even under this type of machining condition.

Figure 5:
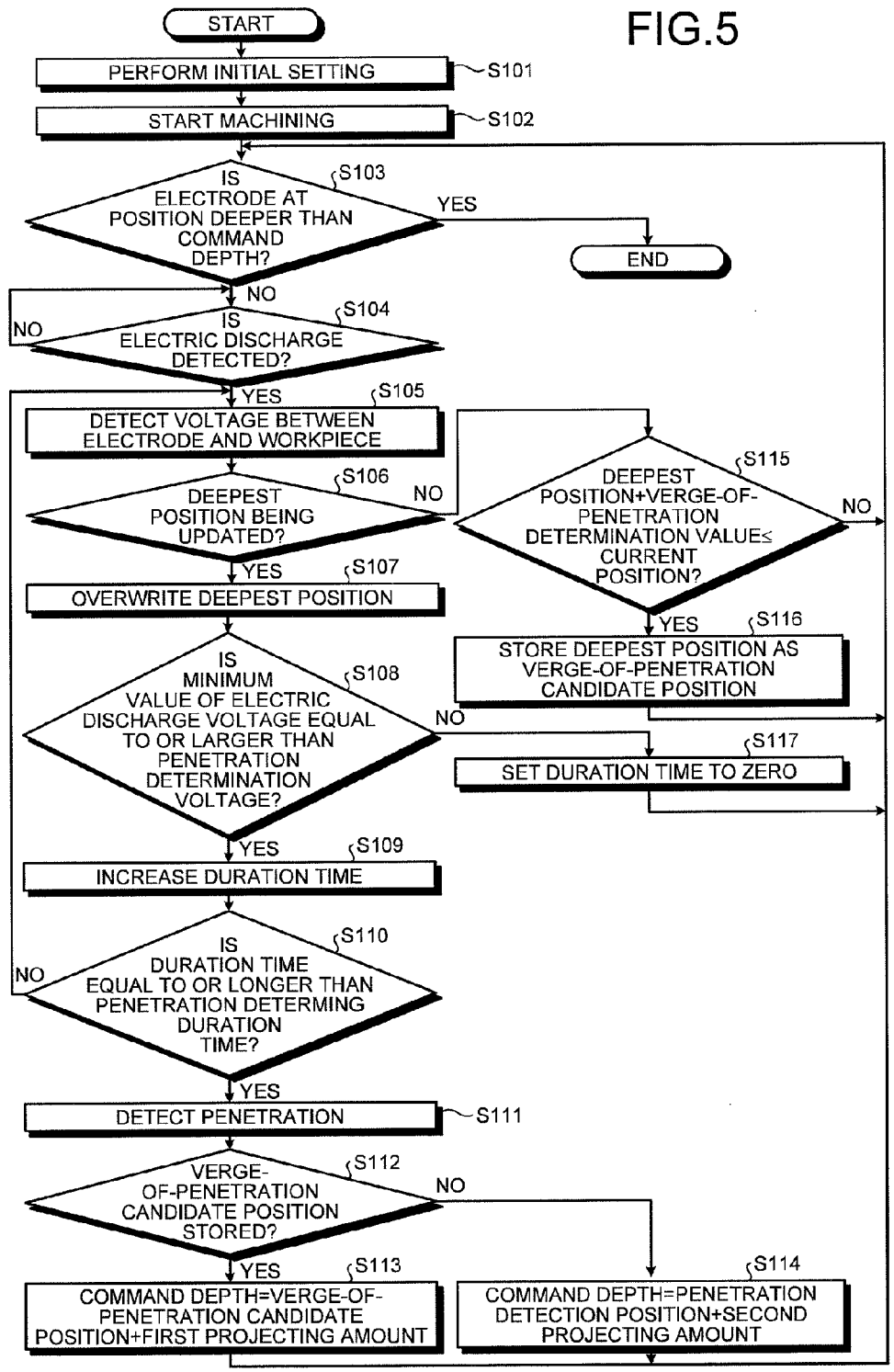
FIG. 5 depicts a flow of a penetration determining operation of an electric discharge machine according to a first embodiment.

FIG. 5 depicts a flow of a penetration determining operation of the electric discharge machine according to the first embodiment. The penetration determining operation of the electric discharge machine is described based on the flow-chart shown in FIG. 5. In the following descriptions, "deep" means that the electrode 1a has approached the command depth (a target coordinate), and an increase of a depth value (a coordinate value) means that the electrode 1a approaches the command depth.

Prior to a start of machining, an initial setting (registration of the command depth 188, the first projecting amount 184, the second projecting amount 185, the penetration determination voltage 181, the verge-of-penetration determination value 183, and the penetration determining duration 182 in the storage unit 18) is performed (Step S101).

Thereafter, the machining control unit 20 starts the machining by executing an NC program (Step S102).

When the machining is started, the command depth/current position comparison unit 11 compares the current coordinate position input from the current-coordinate detection unit 10 with the command depth 188 (Step S103). If the command depth 188 is equal to or larger than the current coordinate position (the electrode 1a is at a position equal to or deeper than the command depth 188) (YES at Step S103), the machining ends.

If the command depth 188 is not deeper than the current coordinate position (the electrode 1a is at a position shallower than the command depth 188) (NO at Step S103), it is checked if the electric-discharge detection unit 5 has detected the electric discharge between the electrode 1a and the workpiece W (Step S104). If the electric-discharge detection unit 5 has not detected the electric discharge (NO at Step S104), Step S104 is repeated until the electric discharge is detected.

When the electric-discharge detection unit 5 has detected the electric discharge (YES at Step S104), the electric-discharge-voltage detection unit 7 detects the electric discharge voltage between the electrode 1a and the workpiece W (Step S105).

Subsequently, the deepest-position storage unit 13 determines whether the deepest position is being updated with the current coordinate position of the electrode 1a detected by the current-coordinate detection unit 10 (Step S106). When the deepest position is being updated (YES at Step S106), the deepest-position storage unit 13 overwrites the deepest position 189 stored in the storage unit 18 (Step S107). Thereafter, the penetration-determination voltage/electric-discharge-voltage comparison unit 8 checks whether the minimum value of the electric discharge voltage is equal to or higher than the penetration determination voltage 181 (Step S108). If the minimum value of the electric discharge voltage is equal to or higher than the penetration determination voltage 181 (YES at Step S108), a duration for which the minimum value of the electric discharge voltage is equal to or higher than the penetration determination voltage is increased by a measurement interval (Step S109). Subsequently, the penetration detection unit 6 determines whether the duration is equal to or longer than the penetration determining duration 182 stored in the storage unit 18 (Step S110). If the duration for which the minimum value of the electric discharge voltage is equal to or higher than the penetration determination voltage is equal to or longer than the penetration determining duration 182 stored in the storage unit 18 (YES at Step S110), the penetration detection unit 6 determines that the electrode 1a has penetrated through the workpiece W (Step S111).

When the deepest position is not being updated (NO at Step S106), the verge-of-penetration-candidate-position determination unit 14 determines whether the current coordinate value is equal to or larger than a coordinated value obtained by adding the verge-of-penetration determination value 183 to the deepest position (Step S115). If the current coordinate value is equal to or larger than the coordinate value obtained by adding the verge-of-penetration determination value 183 to the deepest position (YES at Step S115), the deepest position is stored in the storage unit 18 as the verge-of-penetration candidate position 186 (Step S116). If the current coordinate value is less than the coordinate value obtained by adding the verge-of-penetration determination value 183 to the deepest position (NO at Step S115), the process proceeds to Step S103.

Furthermore, if the minimum value of the electric discharge voltage is lower than the penetration determination voltage 181 (NO at Step S108), the duration is set to zero (Step S117). Thereafter, the process proceeds to Step S103. Although the duration is set to zero at a time when the minimum value of the electric discharge voltage is lower than the penetration determination voltage in this example, as a measure against noise, it is also possible to control the operation not to set the duration to zero when the number of events in which the minimum value of the electric discharge voltage has become lower than the penetration determination voltage 181 is equal to or less than a predetermined number in a certain length of time.

After the penetration detection unit 6 detects that the electrode 1a has penetrated through the workpiece W, the verge-of-penetration-candidate-position presence determination unit 15 determines whether the verge-of-penetration candidate position 186 is stored in the storage unit 18 (Step S112). If the verge-of-penetration candidate position 186 is stored in the storage unit 18 (YES at Step S112), the calculation-start commanding unit 17 calculates a coordinate position obtained by adding the verge-of-penetration candidate position 186 and the first projecting amount 184, and stores the calculated coordinate position in the storage unit 18 as the command depth 188 (Step S113). If the verge-of-penetration candidate position 186 is not stored in the storage unit 18 (NO at Step S112), the calculation-start commanding unit 17 calculates a coordinate position obtained by adding the penetration detection position 187 and the second projecting amount 185, and stores the calculated coordinate position in the storage unit 18 as the command depth 188 (Step S114).

After the command depth 188 is updated at Step S113 or Step S114, a determination is made at Step S103 based on the updated command depth 188. With this operation, the machining ends at a time when the updated command depth 188 becomes larger than the current coordinate position (the electrode 1a reaches a position deeper than the command depth 188).

Figure 6B:
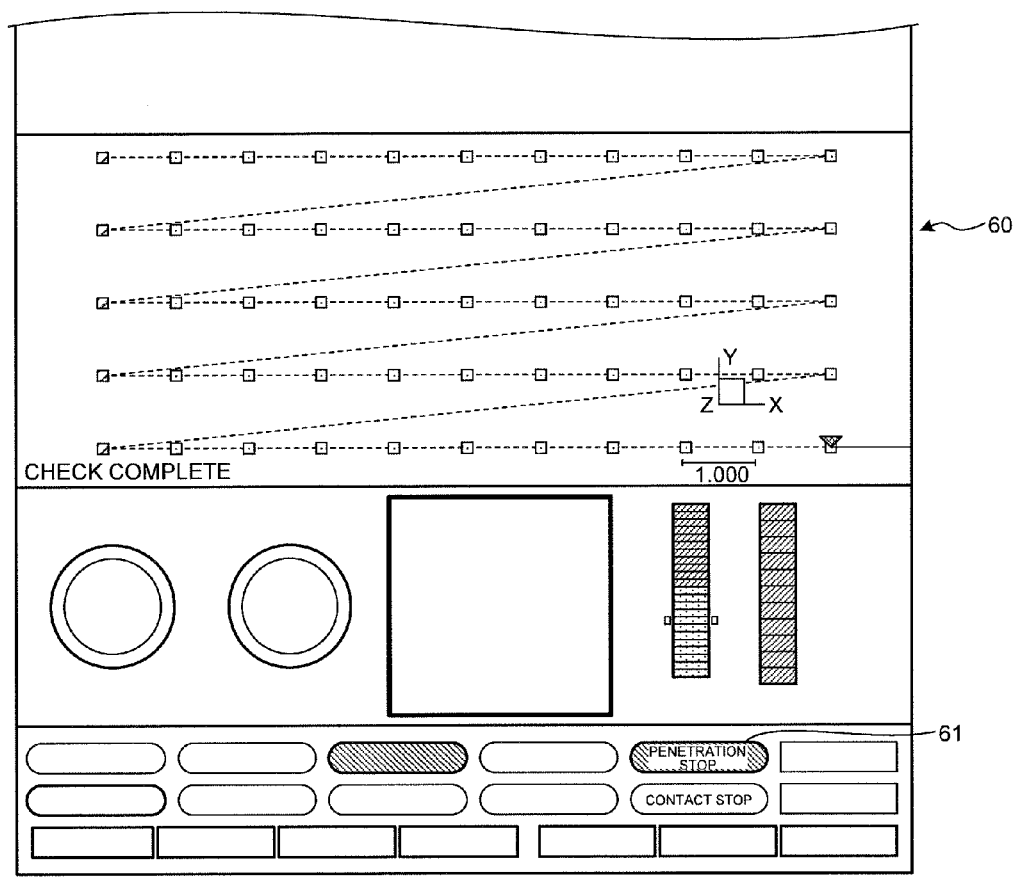
FIG. 6B is an example of a monitor screen of an electric discharge machine during machining.

FIG. 6A and FIG. 6B are examples of a monitor screen of the electric discharge machine during machining. Because the workpiece W is dipped into the machining fluid 32, it is difficult to recognize by sight whether the electrode 1a has penetrated through the workpiece W. However, in the first embodiment, because the penetration detection unit 6 displays a message on a monitor screen 60 during the machining when the penetration detection unit 6 detects the penetration of the hole, a user can recognize immediately whether the hole has penetrated through the workpiece during the machining. For example, as shown in FIG. 6A, a penetration-detection display icon 61 is in a hidden status before detecting the penetration of the hole, and at a time when the penetration of the hole is detected, the penetration-detection display icon 61 is changed to a displayed status as shown in FIG. 6B, thus the user can recognize immediately that the hole has penetrated through the workpiece even during the machining.

Figure 7:
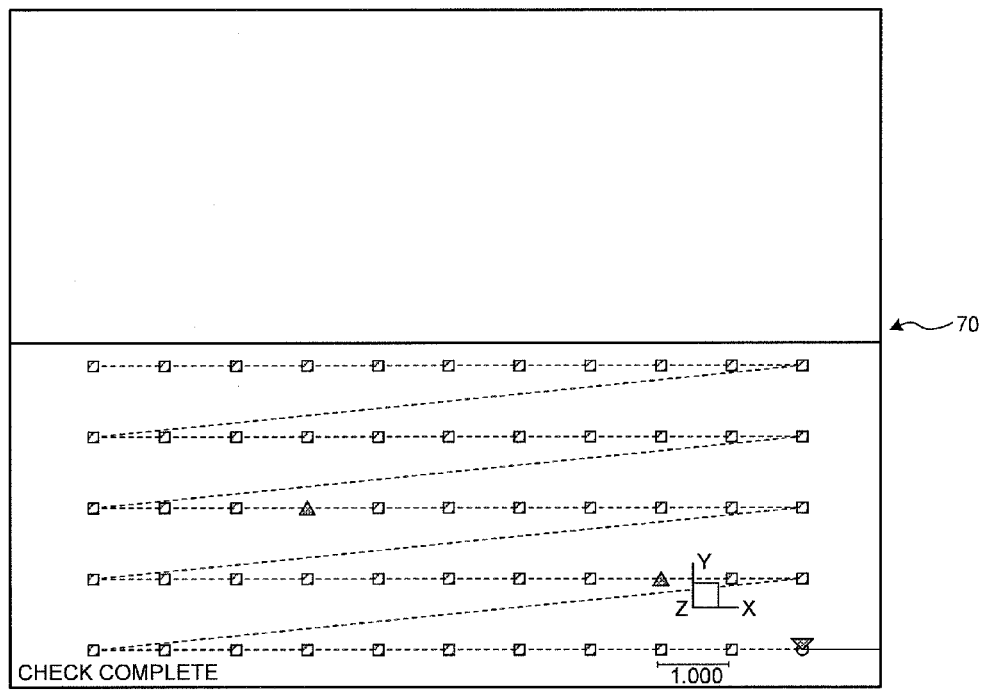
FIG. 7 is an example of a monitor screen of an electric discharge machine after machining ends.

FIG. 7 is an example of the monitor screen of the electric discharge machine after machining ends. A plan view of the workpiece W is displayed on a monitor screen 70 after the machining ends, on which a hole for which the hole machining has ended after detecting the penetration and a hole for which the hole machining has ended without detecting the penetration are displayed distinctly by different colors or marks. That is, it is stored whether the hole machining has ended with the command depth 188 updated and displayed distinctly. In FIG. 7, a hole for which the hole machining has ended after normally detecting the penetration is displayed as " ", a hole to be created is displayed as "O", and a hole for which the hole machining has ended without detecting the penetration is displayed as "Δ". Thus, it is possible to easily recognize whether the machined hole has penetrated through the workpiece afterward. Furthermore, an operation for resuming the hole machining for the hole for which the hole machining has ended without detecting the penetration may be performed on the monitor screen 70 after the machining ends. Thus, re-machining for the hole that has not penetrated through the workpiece may be easily performed.

Figure 8:
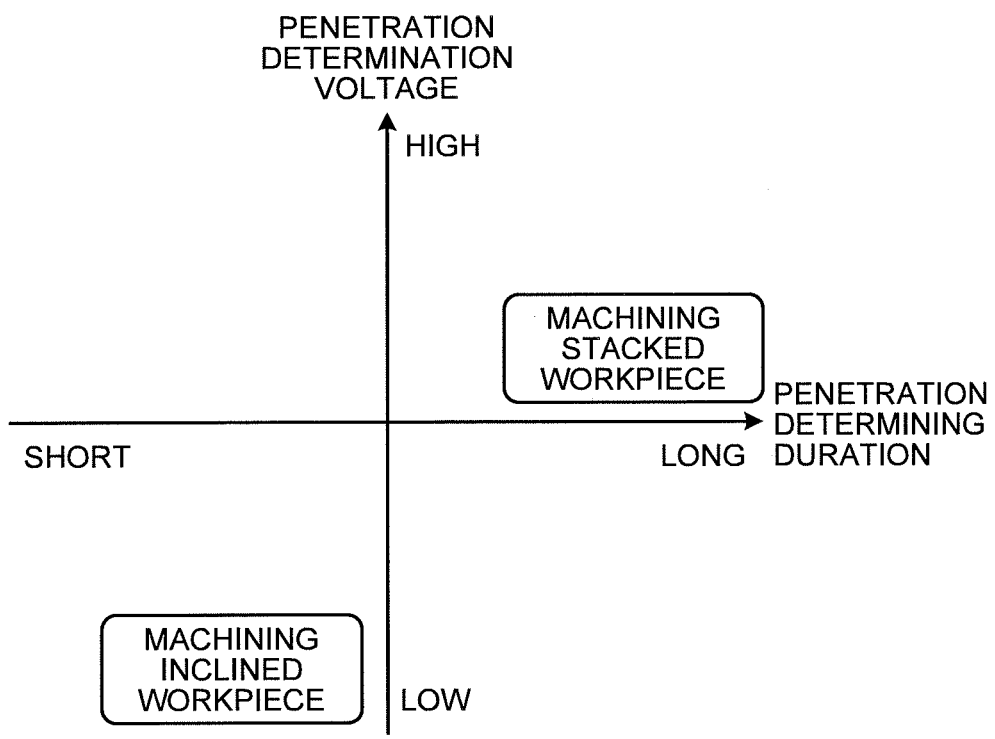
FIG. 8 depicts a relationship between a penetration determination voltage and a penetration determining duration.

FIG. 8 depicts a relationship between a penetration determination voltage and a penetration determining duration. The higher the penetration determination voltage 181 is, the more difficult it is to detect the penetration; and the lower the penetration determination voltage 181 is, the easier it is to detect the penetration. Furthermore, the longer the penetration determining duration 182 is, the more difficult it is to detect the penetration; and the shorter the penetration determining duration 182 is, the easier it is to detect the penetration. Therefore, in FIG. 8, proceeding toward a right side direction and an upper side direction represent a condition in which it is more difficult to detect the penetration of the hole; while proceeding toward a left side direction and a lower side direction represent a condition in which it is easier to detect the penetration of the hole. Further, FIG. 8 depicts that it is preferable to set the penetration determining duration 182 longer for machining a stacked workpiece (a hole machining for a plurality of workpieces W arranged in an overlapped manner), and it is preferred to set the penetration determination voltage 181 lower for machining an inclined workpiece (a hole machining in which the workpiece W has an inclination with respect to the electrode 1a).

By appropriately changing the values of the penetration determination voltage and the penetration determining duration according to the material and shape of the workpiece W, diameter of the electrode 1a, the machining voltage, and the like, it is possible to increase an accuracy of detecting the verge-of-penetration or the penetration of the hole. For example, when the workpiece has a shape that is inclined on an output side of the hole, the penetration can be detected earlier and more accurately by decreasing the detection sensitivity (decreasing the penetration determination voltage). Further, when creating a hole on a plurality of stacked workpieces W at once, the penetration of the hole can be detected accurately by setting the penetration determining duration longer because there is a slight gap between the stacked workpieces.

In this manner, the electric discharge machine according to the first embodiment determines that the electrode has penetrated through the workpiece when an increase of the electric discharge voltage at the verge of time of penetrating the workpiece is detected to be equal to or higher than a predetermined amount and is continuously detected for a predetermined time or longer. That is, it is possible to suppress an amount of projecting the electrode from the workpiece after penetrating through the workpiece to a necessary and sufficient amount. Therefore, even when creating a hole on one side of a workpiece that has a hollow, it is possible to prevent the electrode, which has penetrated through one side of the workpiece, from machining the other side of the workpiece.

Furthermore, by storing the deepest position as the verge-of-penetration candidate position, it is possible to detect the position right before the penetration more accurately. Therefore, it is possible to accurately decide a projecting amount to equalize a diameter of a machined hole uniform. That is, by completing the machining at a coordinate position obtained by adding the projecting amount to the determined verge-of-penetration position, the hole machining can be performed with high accuracy. In the hole machining, it is important to match as much as possible a hole diameter on a side of the workpiece where the electrode enters (an entrance hole diameter) with a hole diameter on a side of the workpiece where the electrode that has penetrated through the workpiece exits (an exit hole diameter). Although the exit hole diameter varies depending on the projecting amount of the electrode after penetrating through the workpiece, it is possible to stabilize the exit hole diameter by keeping the projecting amount of the electrode after penetrating through the workpiece constant. This enables a reduction of defects in the hole machining (sagging of the hole and the like), improving the yield ratio.

Moreover, by storing the thickness of the workpiece W in the storage unit in advance, it is possible to configure the calculation unit 16 to detect the wear amount (the wear percentage) of the electrode based on the feed amount of the electrode and the thickness of the workpiece W. For example, if the thickness of the workpiece W is 10 millimeters and the feed amount of the electrode is 11 millimeters, the wear amount of the electrode can be detected as 1 millimeter (the wear percentage of 10%). With this configuration, because a wear length of the electrode is clearly detected from a difference between the thickness and the position at which the verge-of-penetration is detected without measuring the wear of the electrode, machining for the next hole can be performed in a rapid manner even in consecutive hole machining. In addition, even when the thickness of the workpiece W is changed, a necessary length of the electrode can be calculated.

Second Embodiment

Figure 9:
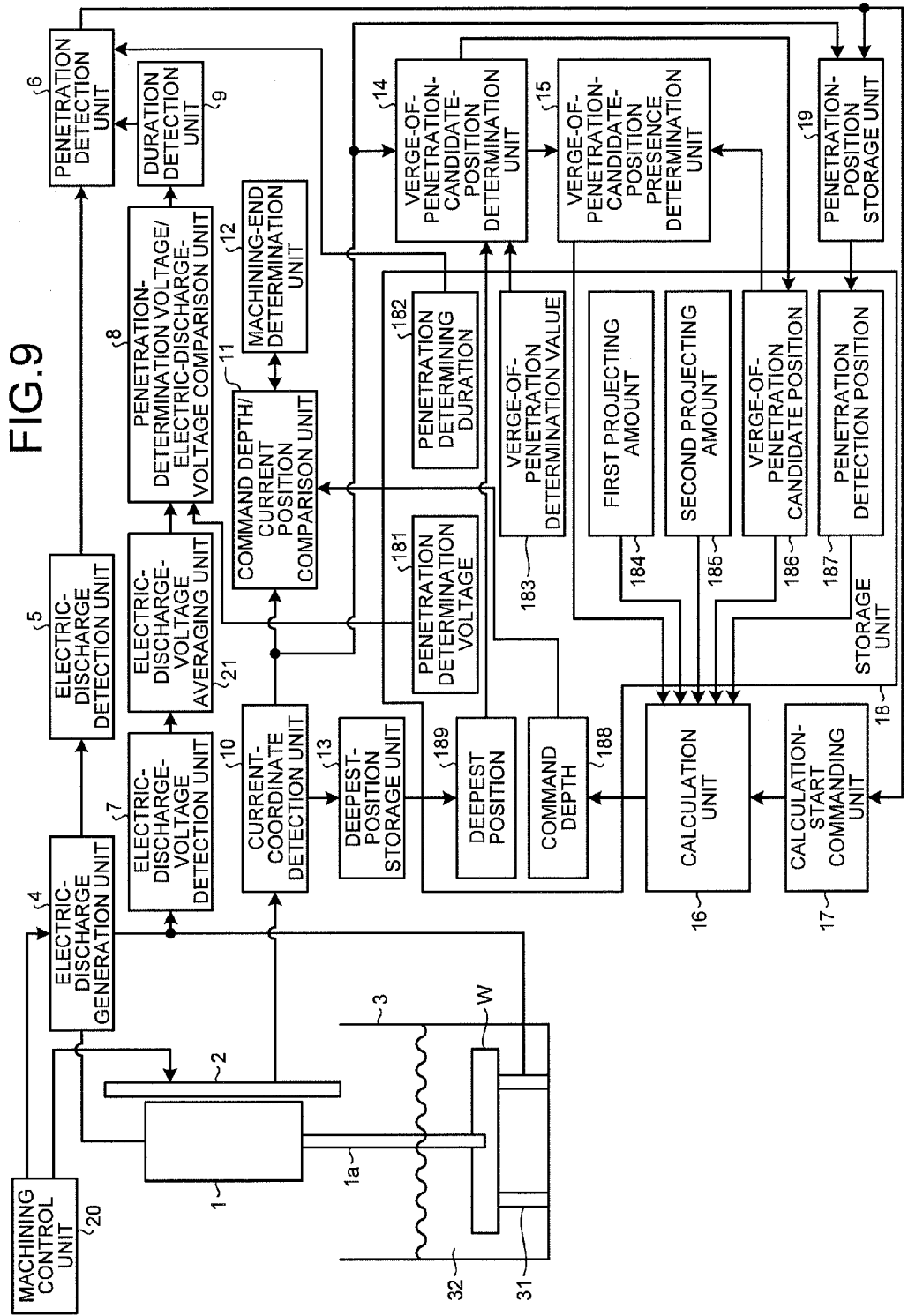
FIG. 9 depicts a configuration of an electric discharge machine according to a second embodiment of the present invention.

FIG. 9 depicts a configuration of an electric discharge machine according to a second embodiment of the present invention. The electric discharge machine according to the second embodiment is different from the electric discharge machine according to the first embodiment in that an electric-discharge-voltage averaging unit 21 is included. The electric-discharge-voltage averaging unit 21 outputs an average value of the electric discharge voltage (an average electric discharge voltage) in a certain length of time based on the electric discharge voltage detected by the electric-discharge-voltage detection unit 7. In the second embodiment, the penetration-determination voltage/electric-discharge-voltage comparison unit 8 compares the average electric discharge voltage input from the electric-discharge-voltage averaging unit 21 with the penetration determination voltage 181, and outputs a result of the comparison to the duration detection unit 9. The other configurations and operations are the same as those of the first embodiment.

According to the second embodiment, because it is determined whether the electrode has penetrated through the workpiece based on the average value of the electric discharge voltage, it is possible to improve the determination accuracy.

INDUSTRIAL APPLICABILITY

As described above, the electric discharge machine and the electric discharge machining method according to the present invention are useful to be capable of performing an accurate detection of a position at which an electrode has penetrated through a workpiece, and are particularly suitable when machining a hole on one side of a workpiece that is hollow shaped.

REFERENCE SIGNS LIST 1 machining head
2 feeding mechanism
3 machining tub
4 electric-discharge generation unit
5 electric-discharge detection unit
6 penetration detection unit
7 electric-discharge-voltage detection unit
8 penetration-determination voltage/electric-discharge-voltage comparison unit
9 duration detection unit
10 current-coordinate detection unit
11 command depth/current position comparison unit
12 machining-end determination unit
13 deepest-position storage unit
14 verge-of-penetration-candidate-position determination unit
15 verge-of-penetration-candidate-position presence determination unit
16 calculation unit
17 calculation-start commanding unit
18 storage unit
19 penetration-position storage unit
20 machining control unit
21 electric-discharge-voltage averaging unit
31 workpiece supporting mount
32 machining fluid
60 monitor screen during machining
61 penetration-detection display icon
70 monitor screen after machining ends
181 penetration determination voltage
182 penetration determining duration
183 verge-of-penetration determination value
184 first projecting amount
185 second projecting amount
186 verge-of-penetration candidate position
187 penetration detection position
188 command depth
189 deepest position

The invention claimed is:

1. An electric discharge machine configured to perform a hole machining on a workpiece by applying a voltage between an electrode and the workpiece to generate an electric discharge therebetween and moving the electrode to a position of a command depth, the electric discharge machine comprising:
a storage unit configured to store in advance therein a penetration determination voltage and a penetration determining duration used for determining whether the electrode has penetrated through the workpiece, a first projecting amount used for deciding a projecting amount of the electrode after penetrating through the workpiece, and the command depth, wherein said projecting amount accounts for consumption of the electrode during machining;
a current-coordinate detection unit configured to detect a current position of the electrode;
an electric-discharge-voltage detection unit configured to detect a voltage of the electric discharge during an execution of the hole machining;
an electric-discharge voltage averaging unit configured to calculate an average voltage of the voltage of the electric discharge detected by the electric-discharge-voltage detection unit for each predetermined period;
a penetration detection unit configured to determine, when a state where the average voltage calculated by the electric-discharge voltage averaging unit is higher than the penetration determination voltage continues for a time equal to or longer than the penetration determining duration, that the electrode has penetrated through the workpiece; and
a calculation unit configured to calculate, at a time when the penetration detection unit determines that the electrode has penetrated through the workpiece, a position obtained by adding the first projecting amount to the current position of the electrode detected by the current-coordinate detection unit, and update the command depth stored in the storage unit with the calculated position, wherein
when the command depth is updated, the electric discharge machine is configured to move the electrode from the current position to a position of the updated command depth,
wherein
the storage unit further stores in advance therein a verge-of-penetration determination value used for determining whether the electrode is in a verge-of-penetration state where the electrode starts to penetrate through the workpiece, and a second projecting amount used for deciding the projecting amount of the electrode after penetrating through the workpiece,
the electric discharge machine further comprises:
a deepest-position storage unit that stores a deepest position at which the electrode has approached closest to the command depth in the storage unit; and
a verge-of-penetration-candidate-position determination unit that stores, when the current position detected by the current-coordinate detection unit is closer to the command depth than to a position obtained by adding the verge-of-penetration determination value to the deepest position stored in the storage unit, the current position in the storage unit as a verge-of-penetration candidate position, and
when the verge-of-penetration candidate position is stored in the storage unit at the time when the penetration detection unit determines that the electrode has penetrated through the workpiece, the calculation unit updates the command depth stored in the storage unit with a position obtained by adding the second projecting amount to the verge-of-penetration candidate position.

2. The electric discharge machine according to claim 1, wherein the storage unit further stores therein information on whether it is a hole for which the hole machining has ended after updating the command depth.

3. The electric discharge machine according to claim 2, wherein the hole for which the hole machining has ended after updating the command depth and a hole for which the hole machining has ended without updating the command depth are distinctly displayed on a monitor screen.

4. The electric discharge machine according to claim 3, wherein a button for executing a re-machining for the hole for which the hole machining has ended without updating the command depth is displayed on the monitor screen.

5. The electric discharge machine according to claim 1, wherein an update of the command depth is displayed in real time during the hole machining.

6. The electric discharge machine according to claim 1, wherein a wear amount of the electrode is calculated based on a thickness of the workpiece stored in the storage unit in advance and a feed amount for the electrode to reach the command depth.

7. The electric discharge machine according to claim 1, wherein the predetermined period and the penetration determination voltage are set arbitrarily.

* * * * *